US008433705B1

(12) United States Patent  
Dredze et al.

(10) Patent No.: US 8,433,705 B1  
(45) Date of Patent: Apr. 30, 2013

(54) FACET SUGGESTION FOR SEARCH QUERY AUGMENTATION

(75) Inventors: Mark H. Dredze, Baltimore, MD (US); William N. Schilit, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 173 days.

(21) Appl. No.: 12/894,079

(22) Filed: Sep. 29, 2010

Related U.S. Application Data

(60) Provisional application No. 61/247,512, filed on Sep. 30, 2009.

(51) Int. Cl.  
*G06F 17/30* (2006.01)

(52) U.S. Cl.  
USPC .......................................................... 707/723

(58) Field of Classification Search .................. 707/723  
See application file for complete search history.

(56) References Cited

U.S. PATENT DOCUMENTS

| | | | | |
|---|---|---|---|---|
| 6,578,022 | B1 * | 6/2003 | Foulger et al. .................. | 706/45 |
| 2008/0250008 | A1 * | 10/2008 | Gollapudi et al. ................ | 707/5 |
| 2009/0222412 | A1 * | 9/2009 | Lee et al. ........................... | 707/3 |
| 2009/0276417 | A1 * | 11/2009 | Shapira et al. ..................... | 707/5 |
| 2011/0252013 | A1 * | 10/2011 | Lempel et al. ................ | 707/706 |

OTHER PUBLICATIONS

Kim et al., "Ranking using Multiple Document Types in Desktop Search", SIGIR'10 Jul. 19-23, 2010, Geneva, Switzerland.*  
Yeung et al., "A Bayesian Approach for Learning Document Type Relevance", Springer-Verlag Berlin Heidelberg 2007.*  
Matsuda et al., "Task-Oriented World Wide Web Retrieval by Document Type Classification", ACM 1999.*  
Chatvichienchai et al., "An Effective Document Search Technique by Semantic Relationship Approach", IEEE 2009.*

* cited by examiner

*Primary Examiner* — James Trujillo  
*Assistant Examiner* — Mohsen Almani  
(74) *Attorney, Agent, or Firm* — Morgan, Lewis & Bockius LLP (57) ABSTRACT

A method searches a set of information using a computer. The method generates a set of search results based on a search query. Then, without further user input, the method generates a set of candidate facets, where each of the candidate facets can be used to select a subset of the search results. The method ranks the candidate facets in accordance with selectivity of the candidate facets and selects a plurality of facets from among the candidate facets for presentation to the user. The selection is in accordance with the rankings of the candidate facets. The method formats the presentation facets for display to the user. In response to user selection of a presentation facet, the method generates a revised search query comprising the original search query and the selected presentation facet, and generates a revised set of search results based on the revised search query.

29 Claims, 7 Drawing Sheets

Operator List 222

| | Operator | Description | Example(s) |
|---|---|---|---|
| 302 | to: | Used to specify a message recipient | to:john – all messages sent to John (by anyone) |
| 304 | from: | Used to specify a message sender | from:amy – all messages sent by Amy |
| 306 | subject: | Used to specify words in the subject line | subject:dinner – all messages that have the word "dinner" in the subject |
| 308 | label: | Used to specify words in a label | label:friends – all messages that have been assigned the label "friends" |
| 310 | list: | Used to specify messages to or from a mailing list | list:info@example.com – all messages sent to or from info@example.com |
| 312 | cc: | Used to specify message recipients on the cc list | cc:john – all messages for which John appears on the CC list |
| 314 | after: | Used to specify messages sent after a certain date | after:2009/10/15 – all messages sent after October 15, 2009. |
| 316 | before: | Used to specify messages sent before a certain date | before:2009/10/31 – all messages sent before October 31, 2009. |
| 318 | deliveredto: | Used to specify to whom a message was delivered | deliveredto:username@gmail.com – all messages with username@gmail.com in the Delivered-To: field of the message header (which can help find messages forwarded from another account or ones sent to an alias). |
| 320 | has:attachment | Used to search for messages with attachments | from:john has:attachment – all messages from John that have attachments. |
| 322 | is:starred | Used to search for messages that are starred | is:starred from:amy – all messages from Amy that are starred |
| 324 | is:unread | Used to search for messages that are unread | is:unread from:john – all messages from John that are unread |
| 326 | is:read | Used to search for messages that are read | is:read from:amy is:starred – all starred messages from Amy that have been read |
| 328 | is:chat | Used to identify chat messages | is:chat from:john – all chat messages from John. |
| 330 | in:inbox | Used to search for messages in the Inbox | is:inbox from:john – all messages from John that are in the Inbox |
| 332 | in:trash | Used to search for messages placed in Trash | is:trash from:bob – all messages from Bob that have been placed into the Trash folder |
| 334 | in:spam | Used to search for messages identify as spam | Is:spam from:bob – all messages from Bob that have been identified as spam |
| 336 | ⋮ | | |

FACET SUGGESTION FOR SEARCH QUERY AUGMENTATION

RELATED APPLICATIONS

This application claims priority to U.S. provisional patent application 61/247,512, "Facet Suggestion for Search Query Augmentation," filed Sep. 30, 2009, which is hereby incorporated by reference in its entirety.

TECHNICAL FIELD

The disclosed embodiments relate generally to suggesting query refinements, and more specifically to ranking of potential query refinements that are based on facets associated with search results from an initial search query.

BACKGROUND

As electronic mail becomes more popular, users face large volumes of messages in their electronic mail folders. This makes at least two important tasks difficult: triage of new messages and searching for existing messages. Whether for searching or triage, a user would like to find or dispose of the messages quickly, but may not know an optimal strategy.

For example, a user with 100 new electronic messages may scan the messages one by one, spending too much time addressing less relevant messages, and taking longer to discover the more important messages. Similarly, if a search query returns many messages, the user may need to scan the messages individually to find the desired one(s). In either case, the user spends too much time looking at less relevant messages.

SUMMARY

The above deficiencies and other problems associated with searching a set of information are reduced by the disclosed embodiments. In some embodiments, the set of information is an email folder or account in an electronic messaging system. In some other embodiments, the set of information is a database of retail products. In some embodiments, there is a graphical user interface (GUI) that displays potential facets to a user, which may be appended to a user's query to refine a search query.

In accordance with some embodiments, a computer-implemented method searches a set of information. The method utilizes a computer system having one or more processors and memory storing one or more programs. The programs are executed by the one or more processors to perform the operations. The method generates an initial set of search results based on an initial search query. Then, without further user input, the method generates a set of candidate facets, where each of the candidate facets can be used to select a subset of the initial set of search results. The method ranks the candidate facets in accordance with the selectivity of the candidate facets with respect to at least some of the search results and selects a plurality of facets from among the candidate facets for presentation to the user. The selection is in accordance with the rankings of the candidate facets. The method formats the presentation facets for display to the user. In response to user selection of any one of the presentation facets, the method generates a revised search query comprising the initial search query and the selected presentation facet, and generates a revised set of search results based on the revised search query.

In accordance with some embodiments of the aforementioned method, the method determines, without further user input, for each candidate facet which facet characteristics from a predefined set of facet characteristics are characteristics of the candidate facet. The method ranks the candidate facets in accordance with both the selectivity of the candidate facets with respect to at least some of the search results as well as the facet characteristics of the candidate facets.

In some embodiments of the aforementioned method, each facet characteristic of the predefined set of facet characteristics has an associated weight, and the ranking of the candidate facets is based in part on the weights associated with the facet characteristics of the candidate facets.

In accordance with some embodiments, a system for searching a set of information includes: one or more processors, memory, and one or more programs stored in the memory. The one or more programs comprise instructions that are executed by the one or more processors, and include instructions to generate an initial set of search results based on an initial search query. The one or more programs further have instructions to perform the following operations without further user input: generate a set of candidate facets, each of which can be used to select a subset of the initial set of search results; rank the candidate facets in accordance with selectivity of the candidate facets with respect to at least some of the search results; select a plurality of presentation facets from among the candidate facets in accordance with the rankings of the candidate facets; and format for display the presentation facets. The one or more programs further have instructions that execute in response to user selection of any one of the presentation facets. These instructions generate a revised search query comprising the initial search query and the selected presentation facet, and generate a revised set of search results based on the revised search query.

In accordance with some embodiments, a non-transitory computer readable storage medium stores one or more programs configured for execution by one or more processors of a computer. The one or more programs comprise instructions to be executed by the one or more processors, including instructions to generate an initial set of search results based on an initial search query. The one or more programs further include instructions to perform the following operations without further user input: generate a set of candidate facets, each of which can be used to select a subset of the initial set of search results; rank the candidate facets in accordance with selectivity of the candidate facets with respect to at least some of the search results; select a plurality of presentation facets from among the candidate facets in accordance with the rankings of the candidate facets; and format for display the presentation facets. The one or more programs further have instructions that execute in response to user selection of any one of the presentation facets. These instructions generate a revised search query comprising the initial search query and the selected presentation facet, and generate a revised set of search results based on the revised search query.

Thus methods and systems are provided that present useful facet suggestions to a user, making the processes of searching or triage of data faster and more efficient.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 3 provides an exemplary list of operators used to form candidate facets according to some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

DESCRIPTION OF EMBODIMENTS

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

Figure 1:
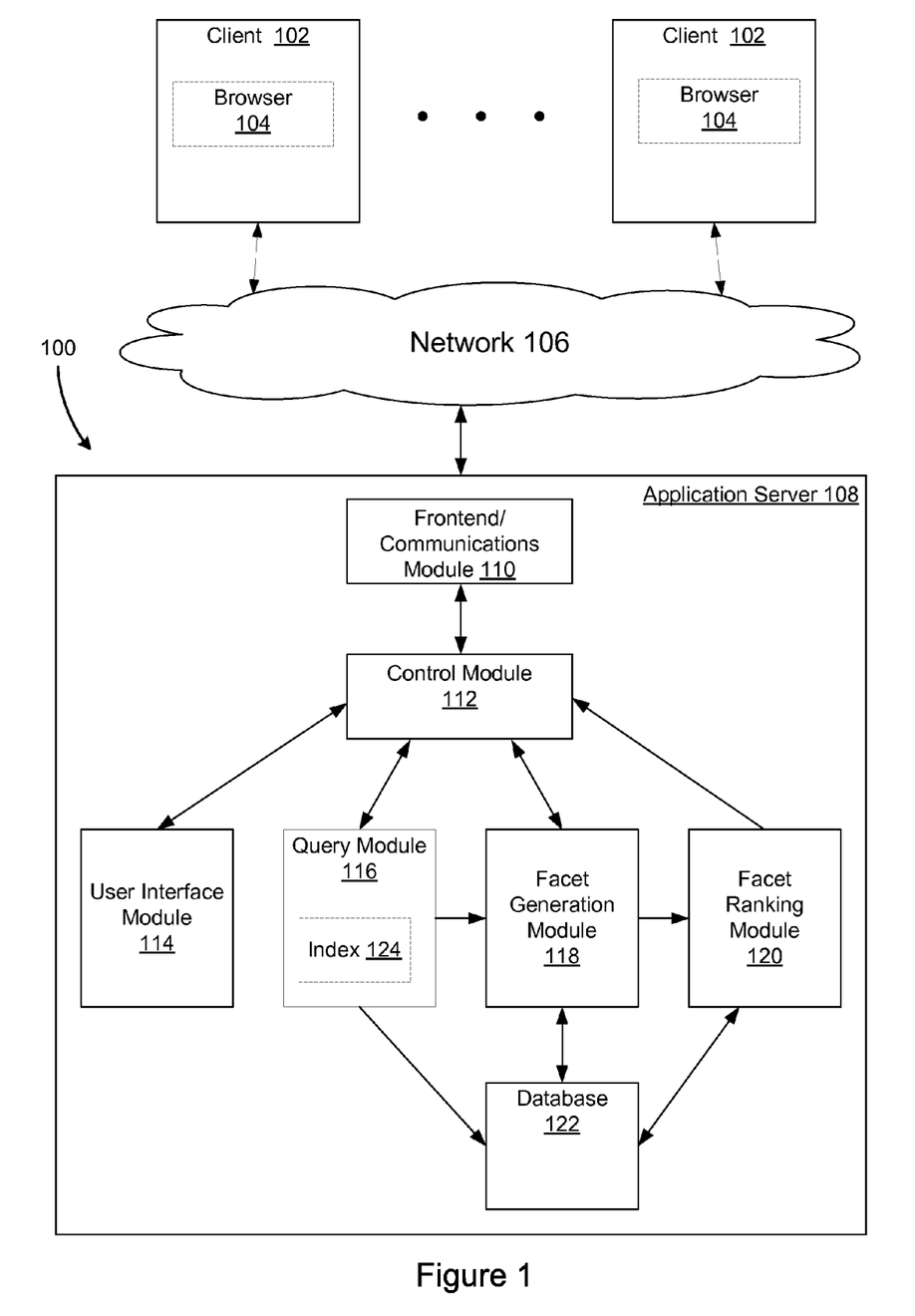
FIG. 1 illustrates an exemplary context in which some embodiments operate.

FIG. 1 is a block diagram of an embodiment of a search query augmentation system 100. The system 100 communicates over a network 106 (such as the Internet) with one or more clients 102. The clients 102 typically use web browsers 104 or other browsing applications to communicate with the system 100, using HTTP requests and responses or other appropriate communication protocols. In alternative embodiments, the clients 102 may communicate with the system 100 using a software program other than a browser. The large majority of clients 102 are typically remotely located from the system 100, but one or more of the clients 102 can be located nearby the system 100. In some embodiments of the system 100, one or more programs execute on an Application Server 108. In certain embodiments, all or some of the modules that comprise the system 100 execute within the Application Server 108.

Communications Module 110 provides communication between the system 100 and the Network 106. For example, the Communications Module 100 receives search queries from clients 102, conveys the search queries to Query Module 116 (via Control Module 112), and also conveys search results produced by the Query Module 116 in response to a respective query back to the requesting client 102. The Communications Module 110 also conveys to the requesting client, along with the search results, facets, which are query augmentation suggestions. Facet generation and ranking are described in detail below. When a user at a client 102 selects a facet (e.g., a facet presented along with search results), the Communication Module 110 receives the selection from the client and conveys that information to the Query Module 116 (via Control module 112). In response the Query Module 116 executes a revised query, comprising the terms of the prior query for which search results were returned, plus the user selected facet. In response to the revised query, the new search results are returned by the Query Module 116 to the requesting client 102 via the Control Module 112 and Communications Module 110. Optionally, along with the new search results the search query augmentation system 100 also returns one or more suggested facets for further narrowing the revised query.

A Control Module 112 runs one or more programs that control all of the other modules that comprise the system 100. A User Interface Module 114 manages the graphical user interface that the system 100 provides to clients 102. For example, User Interface Module 114 determines what is displayed for a user on a client computer 102, and determines what actions a user may take to provide input to the system (such as a search query). Query Module 116 issues queries against a Database 122 to retrieve search results that are responsive to a user's query. In some embodiments, Query Module 116 maintains an Index 124 to facilitate the query process. The Index 124 is a mapping of terms in a database 122 of documents (or other objects or information) to specific documents (or objects or information) in the Database 122, and is sometimes called an inverse index (e.g., because it may be produced by "inverting" the documents in the Database 112). The Index 112 may optionally include additional information as well, such as the locations of terms within documents in the Database 112, and/or information about the portion(s) of the documents in which the term is located.

Facet Generation Module 118 generates lists of candidate facets that can be used to augment a user's search query. Facet Generation Module 118 uses a set of search results from a query, together with a list of operators (see, e.g., FIG. 3 below) to generate the candidate facets. If the number of candidate facets is very small, the User Interface Module 114 may present all of the candidate facets to the user. In general, however, the candidate facets are ranked by the Facet Ranking Module 120, and a subset of the candidate facets is selected for presentation to the user (e.g., facets selected for conveyance to the requesting client 102 along with search results produced in response to the user's search query). The selection of the subset is based on the ranking of the candidate facets, as described in more detail below with respect to FIG. 5 and FIGS. 6A and 6B. The selection of the subset of facets may be performed by the Control Module 112, or other designated module not shown in FIG. 1.

In some embodiments, the Query Module 116 and Database 122 are implemented on different servers from the other portions of the query augmentation system 100, while in other embodiments the other portions of the query augmentation system 100 are fully integrated with the Query Module 116 and Database 122. It is noted that Query Module 116 and Database 122 may together comprise an internet search engine, an enterprise search engine, a search engine specific to a particular online service (e.g., having a database with information concerning products or services offered for sale, or rental or online access), or the like.

Figure 2:
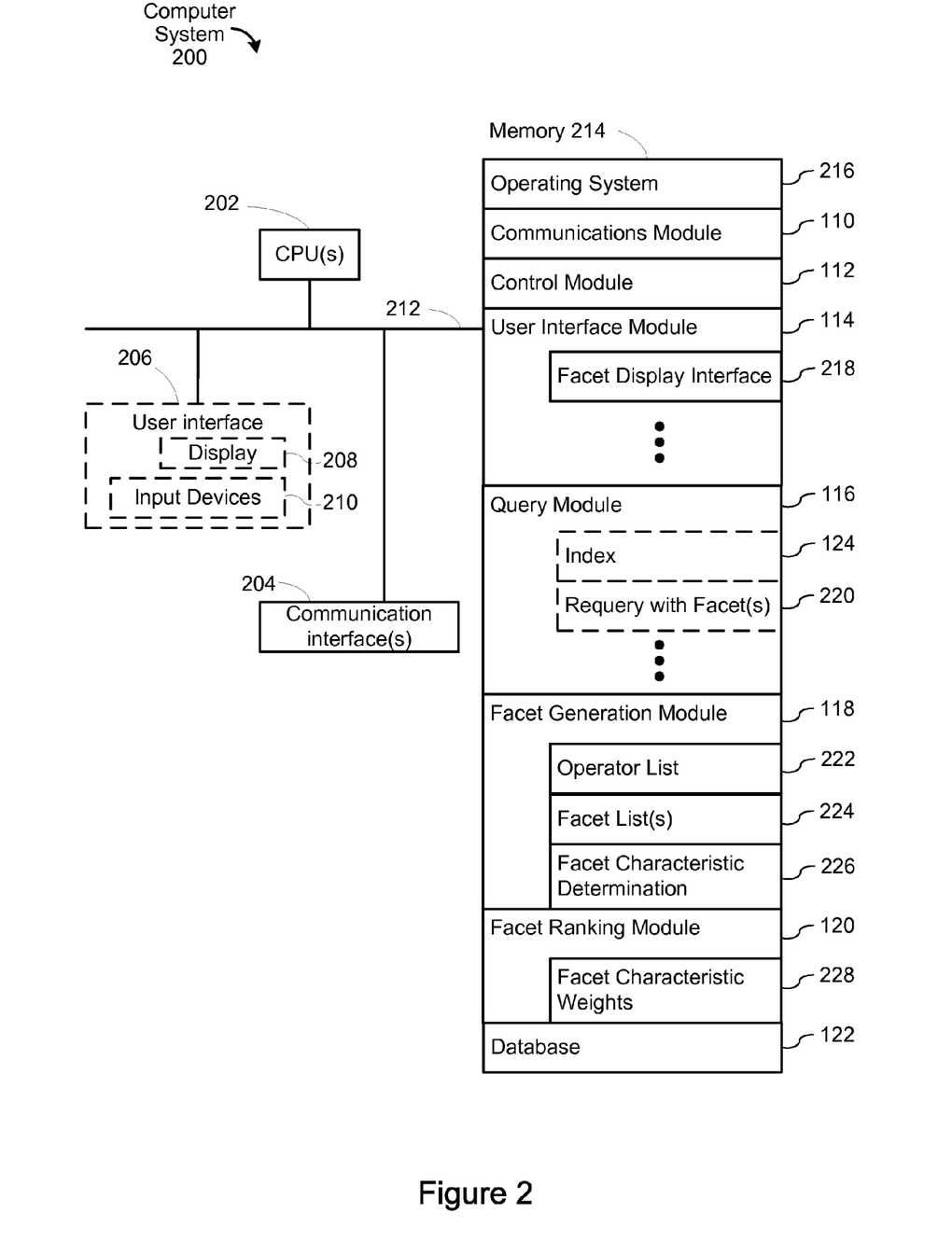
FIG. 2 is a functional description of a computer system according to some embodiments.

FIG. 2 is a block diagram illustrating a Computer System 200 used for search query augmentation in accordance with some embodiments of the present invention. Computer System 200 represents one The Computer System 200 typically includes one or more processing units (CPU's) 202 for executing modules, programs and/or instructions stored in memory 214 and thereby performing processing operations; one or more network or other communications interfaces 204; memory 214; and one or more communication buses 212 for interconnecting these components. In some embodiments, the Computer System 200 includes a user interface 206 comprising a display device 208 and one or more input devices 210; however, since Computer System 200 is typically implemented using a set of servers, in many embodiments Computer System 200 does not include a user interface. In some embodiments, memory 214 includes high-speed random access memory, such as DRAM, SRAM, DDR RAM or other random access solid state memory devices. In some embodiments, memory 214 includes non-volatile memory, such as one or more magnetic disk storage devices, optical disk storage devices, flash memory devices, or other non-volatile solid state storage devices. In some embodiments, memory 214 includes one or more storage devices remotely located from the CPU(s) 202. Memory 214, or alternately the non-volatile memory device(s) within memory 214, comprises a non-transitory computer readable storage medium. In some embodiments, memory 214 or the non-transitory computer readable storage medium of memory 214 stores the following programs, modules and data structures, or a subset thereof:

- an operating system 216 that includes procedures for handling various basic system services and for performing hardware dependent tasks;
- a network communication module 110 that is used for connecting the Computer System 200 to other computers via the one or more communication network interfaces 204 (wired or wireless) and one or more communication networks 106, such as the Internet, other wide area networks, local area networks, metropolitan area networks, and so on;
- a control module 112 that includes procedures to control the interaction of the modules in the Computer System 200;
- a user interface module 114 that determines what is presented to a user (at a client 102), how the information and other components are presented to a user, and what actions a user may take to interact with Computer System 200. In some embodiments, the user interface module 114 includes a facet display interface 218 that determines how facets are displayed to a user, how many facets are displayed, and how a user can select a facet;
- a query module 116 that queries the database 122, in response to a search query, for search results that match the search query (or, alternatively, are responsive to the search query). In some embodiments, the query module 116 includes an index 124, described above. In some embodiments, the query module 116 includes a requery procedure 220 that builds a new set of search results after a user has selected a facet. As described below in FIG. 6B, the requery procedure 220 may run against the database 122, or may build a new set of search results from the prior set of search results;
- a facet generation module 118 that creates a set of candidate facets 224 based on a set of search results and an operator list 222 (which may be stored in the database 122). After generating a list of candidate facets 224, a facet characteristic determination procedure 226 determines which facet characteristics apply to each of the candidate facets. In some embodiments, the facet characteristic determination procedure 226 is part of the facet ranking module 120;
- a facet ranking module 120 that ranks the candidate facets according to selectivity of the candidate facets. In some embodiments the facet ranking module 120 uses weights assigned to each of the facet characteristics (228) as part of the facet ranking process.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 214 may store a subset of the modules and data structures identified above. Furthermore, memory 214 may store a database 122 or additional modules and data structures not described above.

In some embodiments, the database 122 stores the set of information to be searched. In some embodiments, the database 122 stores the operator list 222, the facet characteristic weights 228, and or other data used by any of the modules comprising Computer System 200.

Although FIG. 2 shows a Computer System used for search query augmentation, FIG. 2 is intended more as functional description of the various features which may be present in a set of one or more computers (e.g., one or more server systems or server computers) rather than as a structural schematic of the embodiments described herein. In practice, and as recognized by those of ordinary skill in the art, items shown separately could be combined and some items could be separated. For example, some items shown separately in FIG. 2 could be implemented on individual computer systems and single items could be implemented by one or more computer systems. The actual number of computers used to implement a search query augmentation system and how features are allocated among them will vary from one implementation to another, and may depend in part on the amount of data traffic that the system must handle during peak usage periods as well as during average usage periods.

FIGS. 3-7 provide further details about the operation of a search query augmentation system in accordance with embodiments of the present invention.

In addition to the search terms in a query, a query may contain one or more facets that specify properties sought in the search results. In many cases facets use metadata to specify the properties, but the properties can also be based on the content of the records searched. For example, when searching for documents on the Internet, a search query could include a "PDF type" facet that specifies that the documents sought are Adobe® Acrobat® files (PDF), e.g., by including the search facet "type:PDF". This example facet comprises the operator "type:" and the operand "PDF". As used herein, each "facet" comprises an operator plus zero or more operands. In some embodiments, a plurality of the candidate facets (and typically most of the candidate facets) comprise an operator plus one or more operands. One of skill in the art would recognize that a respective facet can be implemented using different operators with different numbers of parameters. For example, the above mentioned "PDF type" facet can implemented with a zero operand operator, "is_pdf", that specifies a search for PDF files, with the same effect as "type: PDF", which has an operator and one operand.

FIG. 3 provides a list 222 of exemplary operators that are used to build facets in some embodiments that search for electronic messages. The operators "to:" 302, "from:" 304, and "cc:" 312 are used to specify data in fields of electronic message headers, and each of these operators requires a single operand. In some embodiments, the operand value can be a name (or a portion thereof), an email address, or a domain name (such as google.com or yahoo.com). The "deliveredto:" operator 318 is similar to the first three, but in some embodiments the "deliveredto:" operator requires an operand that must be an email address or a domain name. These four operators are sometimes referred to as "person operators."

The "subject:" operator 306 is used for facets that specify words that occur in the subject line of electronic messages. For example, "subject:football" is a facet that specifies a search for messages with the word "football" in the subject line. The "label:" operator 308 is used for facets that specify words appearing in a label associated with an electronic message. Unlike a subject line, labels may be associated with an electronic message after it is sent, the labels can be created by recipients, and multiple labels may be assigned to the same message. If a user has assigned labels to messages, the labels can create an effective way for the user to find the labeled messages. The "list:" operator 310 is used for facets that specify a mailing list that appears in the "to" or "from" header. A mailing list (or distribution list) may be used to specify a group of people or email addresses, so that a user may send a message to the group without specifying the names or email addresses individually. The facet "list: dept200@company.com" would specify all messages sent to or from the mailing list dept200@company.com.

Facets can also be used to specify date ranges. In some embodiments, the operators "after:" 314 and "before:" 316 are used to specify a range of dates. The operators "after:" 314 and "before:" 316 each requires a single operand, which must be a date. In some embodiments, a date operand is formatted as YYYY/MM/DD to prevent ambiguity. In other embodiments the evaluation of dates uses the regional settings on the user's computer. In some embodiments the date operand includes a time value, for example 10:30:00 AM in the operand 2009/10/15 10:30:00 AM. Some embodiments that allow the time to be specified require that the time be specified on a 24 hour clock. In other embodiments the time may be specified on a 12 hour clock with an AM or PM designation. Optionally, the formatting of the time operands is determined by regional settings on the user's computer. In some embodiments, the end point date is included in the scope of the facet; other embodiments exclude the endpoint. In a preferred embodiment, the facet "after:2009/12/10" would specify all messages sent on or after Dec. 10, 2009 (including the endpoint). In an alternative embodiment, a single operator "between:" is used instead of the operators "after:" 314 and "before:" 316. When used, the "between:" operator requires two operands, specifying the beginning and ending dates of a date range. The same issues or options for formatting of date and time operands apply to the "between:" operator.

For electronic messages, the date each message is sent is the only relevant date for a query, and thus the operators "after:" and "before:" are unambiguous. However, in other contexts, such as documents on the Internet, there may be multiple relevant dates, such as the date created, date last changed, date last accessed, date posted on the website, etc. In this context, some embodiments require two operands for the operators "after:" and "before:". One of the operands specifies which date field in the documents to look at, and the other operand specifies the comparison date. Other embodiments address this issue by creating different operators for each of the relevant date fields in the documents. For example, some embodiments use the facets "edited.after:" and "edited.before:" to specify date ranges for when the documents were last edited. In these embodiments, the operators require a single date operand, as described above for the electronic mail operators "after:" and "before:".

The remaining operators listed in FIG. 3 are zero-operand operators, and the meanings are fairly intuitive based on the names of the operators. For example, the "has:attachment" operator 320 specifies a search for electronic messages that have attachments. The operators "is:starred" 322, "is:unread" 324, "is:read" 326, and "is:chat" 328 all specify simple properties of electronic messages. In electronic message systems that indicate importance with a symbol other than a star, the "is:starred" operator is generally replaced by an operator whose name is more meaningful or relevant, such as "is: important". In some embodiments of electronic message systems, there are operators that specify in which folder to look for messages. For example, the "in:inbox" operator 330, the "in:trash" operator 332, and the "in:spam" operator 334 specify certain folders to search for messages. Because a zero-operand operator has no operands, the operand itself is a facet. For example, "has:attachment" is a facet.

Some embodiments use "in:" as an operator, and the specified folder is an operand. In some embodiments that use "in:" as an operator, the operand can be any folder in a user's email account, and not just the predefined folders inbox, trash, and spam. For example, if a user has created a folder called "medical," then the facet "in:medical" could be used to search for messages within the medical folder. In this case, the possible operands are based on the structure of the user's electronic mail folders rather than the initial set of search results.

Figure 4:
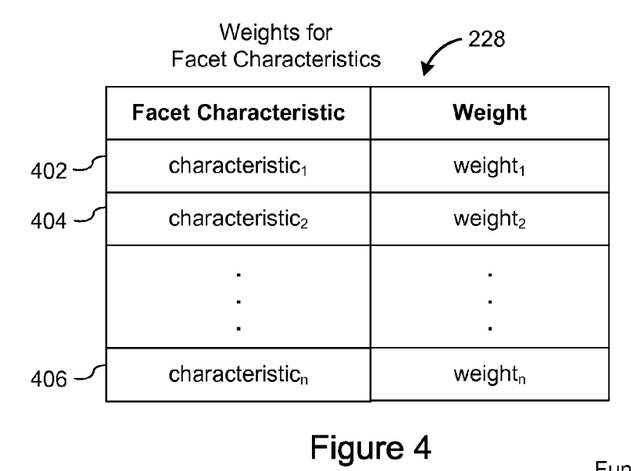
FIG. 4 illustrates how weights are assigned to facet characteristics according to some embodiments.

Because of the large number of operators, and potentially very large number of operands used by those operators, the number of candidate facets can be quite large. For example, in embodiments searching for electronic messages, there is a candidate facet of the form "to:XXXX" for each name XXXX that appears in the "To:" header of a message in the search results. Rather than display all of the candidate facets to the user, embodiments of the present invention rank the candidate facets and display only the highest ranked facets to the user for selection. To evaluate the utility of the candidate facets, embodiments of the present invention use one or more facet characteristics, which are described in more detail below. When a plurality of facet characteristics are used, some embodiments assign weights to each facet characteristic, as shown in Facet Characteristic Weight table 228 in FIG. 4. As shown in FIG. 4, there is a predefined set of n facet characteristics characteristic$_1$ 402, characteristic$_2$ 404, . . . , characteristic$_n$ 406, and these facet characteristics have weights weight$_1$, weight$_2$, . . . , weight$_n$. In some embodiments all of the weights are positive numbers, but in other embodiments some of the weights may be negative.

Figure 5:
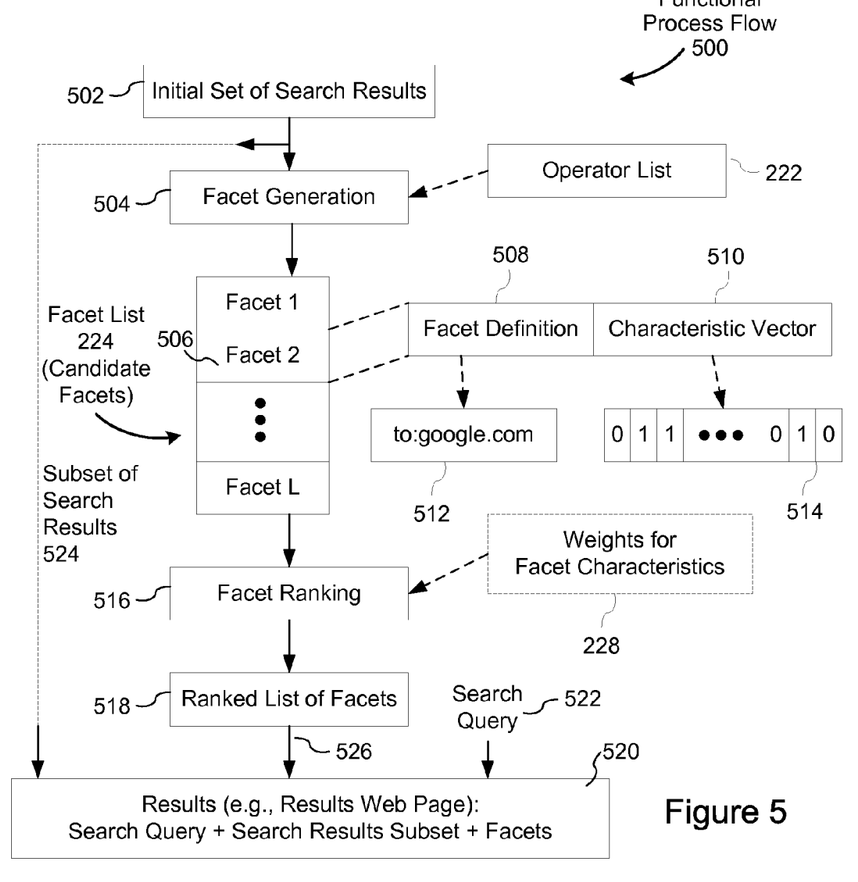
FIG. 5 illustrates a functional process flow according to some embodiments.

FIG. 5 illustrates a functional process flow 500 according to some embodiments. Process flow 500 begins with a set of search results 502, which is generated by Query Module 116 in response to a user's query. Using the initial set of search results 502, and the operator list 222 (e.g., as shown in FIG. 3), the Facet Generation Module 118 generates (504) candidate facets 224. Each zero-operand operator is itself a candidate facet, and for each operator that requires one or more operands, facets are generated based on the data in the initial set of search results. For example, the "from:" operator may be combined with each name or email address that appears in the "From:" header of the messages in the initial set of search results. The facet list 224 does not have a predefined number of candidate facets. The number of candidate facets depends on both the operator list 222 and the initial set of search results 502. Each candidate facet, such as Facet 2 (506) has an associated facet definition 508 and a characteristic vector 510. The facet definition 508 identifies both an operator and any operands, such as "to:google.com" 512 for Facet 2. The Facet Characteristic Determination procedure 226 (FIG. 2) determines which facet characteristics apply to each candidate facet, creating a characteristic vector 510 associated with each candidate facet. Each characteristic vector 510 has n components, where n is the number of predefined facet characteristics. In some embodiments, for each of the n facet characteristics, the corresponding component in the characteristic vector is 1 if the facet characteristic applies to the candidate facet, and is 0 otherwise. Each characteristic vector is thus a list of n zeros and ones, as shown for the characteristic vector 510 for Facet 2. In particular, Facet 2 (506) does not have characteristic$_1$, does have characteristic$_2$, does have characteristic$_3$, etc.

Based on the facet list 224 (which includes the characteristic vectors), and the weights of the facet characteristics 228, Facet Ranking Module 120 ranks (516) the candidate facets to create a ranked list of candidate facets 518. In some embodiments the weights of the facet characteristics are stored as an n-component vector w, and the rank of each candidate facet is computed as the vector dot product of the weights w and the characteristic vector v, namely w·v. In some embodiments, more complex algorithms are used to calculate the ranking of each candidate facet. The simple use of a dot product with a set of weights w makes the approximation that each of the facet characteristics is independent of the other facet characteristics. In general, a facet ranking function is a function that assigns a ranking value to the characteristic vector v of facet. In some embodiments, the facet characteristics are grouped into clusters, and the Facet Ranking Module includes a cluster ranking function for each of the clusters. In these embodiments, the overall ranking for each candidate facet is the sum of the weights computed by the cluster ranking functions. In some embodiments, the clusters of facet characteristics (i.e., the determination of which facet characteristics are assigned to each cluster) are based on a determination of which facet characteristics are dependent on each other.

In some embodiments the top ranked candidate facets (sometimes called presentation facets 526) are automatically presented to the user. In other embodiments, the ranking is used in conjunction with other criteria to determine which candidate facets are presented to the user. In various embodiments, the number of top ranked candidates 526 that are presented to the user (e.g., in a web page or other results document or set 520 that also includes the user-submitted query 522, and a subset 524 of the search results 502) is a fixed number, is based on the amount of room available for displaying facets to the user, or is based on other criteria such as a threshold value. See the description below of element 622 in FIG. 6B for more details.

Figure 6A:
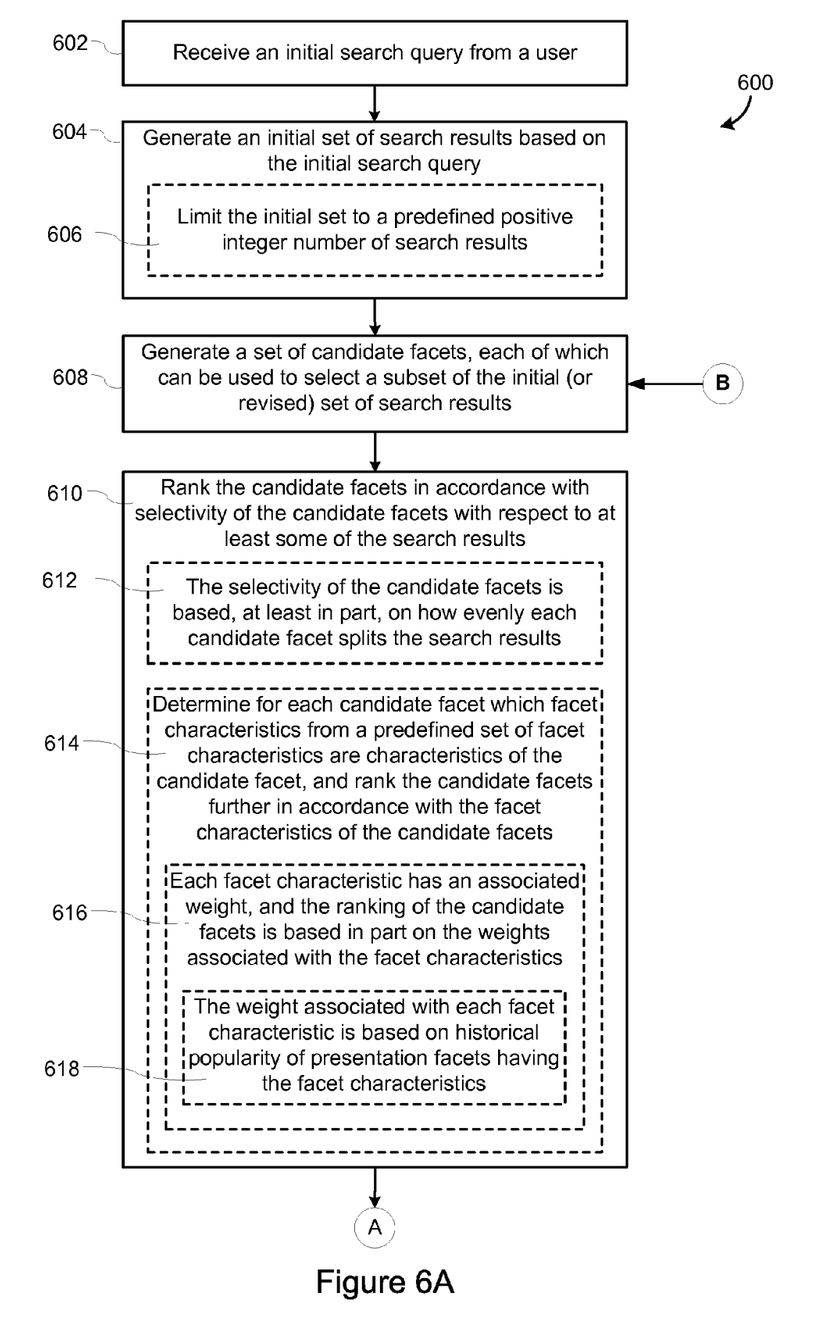
FIGS. 6A and 6B provide a detailed descriptive process flow according to some embodiments.
Figure 6B:
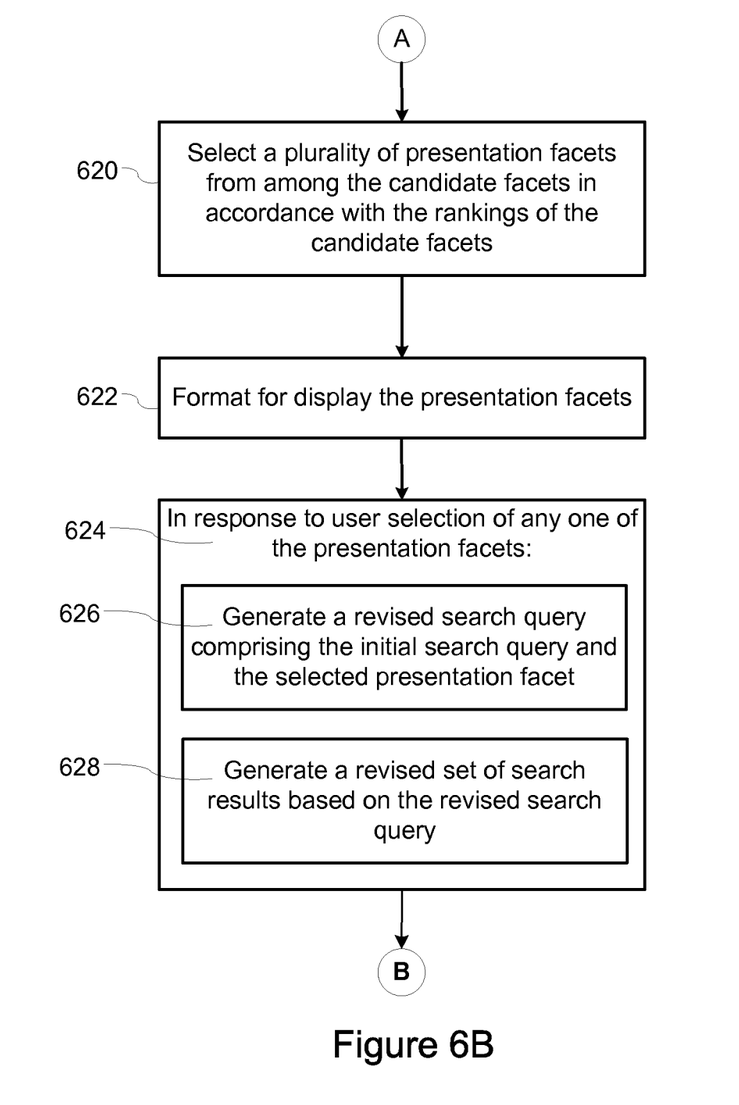

FIGS. 6A and 6B provide a flowchart representing a method 600 for presenting to a user suggestions for augmenting a query, where the suggestions are based, at least in part, on information in an initial set of search results. Method 600 is governed by instructions that are stored in a computer readable storage medium and that are executed by one or more processors of one or more servers or personal computing devices. Each of the operations shown in FIG. 6A or 6B corresponds to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format.

In an embodiment of method 600, the process begins when a user enters an initial search query and the initial search query is received (602). In some embodiments, the initial search query is received by a Communications Module 110 and/or Control Module 112. In some embodiments, the set of information searched in response to the query is an email folder or email account in an electronic mail system. In other embodiments, the information searched in response to the query is a retail database of products. More generally, the information searched in response to the query is a database or other corpus of information.

Based on the initial search query, the Query Module 116 generates (604) an initial set of search results. In some embodiments, the Query Module 116 or Control Module 112 limits (606) the initial set to a predefined positive integer number of search results. For example, the set may be limited to 100 records. In alternative embodiments, the set of search results returned in response to the query is not limited, but there is a subsequent selection from among the set of search results so as to produce the initial set of search results. For example, the subsequent selection may impose a predefined limit on the number of search results selected, or may impose a quality or other restriction so as to produce the initial set of search results. Regardless of whether a limit is imposed on the initial set of search results or as part of subsequent selection, implementation of the limit may use random selection, selection of the highest ranked search results (e.g., PageRank), selection of the records most recently added to the database (e.g., email conversations with the most recently sent messages), selection of the records that are the most popular (e.g., selected the most frequently by users), or other criteria so as to produce a set of search results that complies with the limit. It is noted that one reason for limiting or reducing the size of the initial set of search results is to improve efficiency of subsequent operations of the method 600 while still providing sufficient data to produce good facets for presentation to the user.

In some embodiments, when the initial search query is blank, the initial set of search results is a currently viewed list of records. For example, if a user is viewing an email inbox, the "initial set of search results" comprises the messages in the user's inbox. In alternative embodiments, when there is a default initial set of search results (such as the messages in an inbox), the search query is automatically filled in to correspond to the initial set of search results. For example, while viewing inbox messages, a search query field or display region may be filled in with "in:inbox" so that the displayed search query corresponds to what the user is viewing.

As seen in FIG. 6A, the Facet Generation Module 118 generates (608) a set of candidate facets. Each of the candidate facets can be used to select a subset of the search results. As described above in FIG. 3, facets comprise an operator and zero or more operands. The operators listed in FIG. 3 are exemplary operators when the set of information to be searched is an email folder or email account. For example, the candidate facet "has:attachment" specifies that, when this facet is included in a search query, each email message (or each email conversation in conversation based email systems) in the search results must have at least one attachment. The operator "has:attachment" has zero operands. As another example, the operator "from:" requires an operand, which identifies the sender of a message, such as "from:john". In some embodiments, candidate facets are generated for each operator based on the metadata and/or content in the initial search results. For example, if the initial search results include messages from fifty distinct people, the facet generation operation 608 would create a facet of the form "from: YYYY", where YYYY can be any of the fifty names. Although the operators are predefined, the operators that have one or more operands can generate a large number of facets based on metadata and/or content in the search results.

It is noted that in some embodiments the "from:" operator can also be used with other operands, such as domain names (e.g., "google.com") and special purpose operands (e.g., "mycontactlist," where "from:mycontactlist" is true for any message received from any email address listed in the user contact list). When such additional operands are used, even more candidate facets are generated at 608.

In an embodiment that searches a retail database of products, the generation of facets is similar. For example, if an initial search query is looking for television sets, facets could be generated that specify screen size, brand, price, and so on. Note that the specification of screen size could use a two-operand operator (the size is between x inches and y inches) or two distinct facets (the size is greater than x inches and the size is less than y inches). In some embodiments, some of the facets can be predefined, such as "brand:sony" to specify a facet that would restrict the result set to only Sony® brand televisions. If there were no Sony® televisions in the result set, then "brand:sony" would not be one of the generated facets.

Because of the potentially large number of generated candidate facets, the Facet Ranking Module 120 ranks (610) the candidate facets. In some embodiments, the ranking is in accordance with selectivity of the candidate facets with respect to the initial set of search results. For example, the facet "has:attachment" would not be selective if none of the messages in the initial set of search results had any attachments. The same candidate facet would also not be selective if all of the search results had attachments. In some embodiments, the selectivity of the candidate facets is based, at least in part, on how evenly each candidate facet splits the initial set of search results (612). For example, if exactly half of the initial set of search results are messages with attachments, then "has:attachment" is highly selective. More specifically, one exemplary mathematical definition of selectivity of a candidate facet is $$\text{selectivity} = -\text{abs}\left(\frac{N_T}{2} - N_F\right)$$

where $N_T$ is the total number of search results, $N_F$ is the number of search results that have the candidate facet, and abs( ) computes the absolute value of the number in the parentheses. A "perfect" score would be zero, indicating that a candidate facet exactly splits the search results. All other candidate facets would have a negative selectivity. This definition of selectivity can be converted to positive values by, for example, adding an offset such as $$\frac{N_T}{2}$$

to the selectivity score shown above.

In some embodiments, each candidate facet has zero or more facet characteristics from a predefined set of facet characteristics (as described above with respect to FIGS. 3 and 4). In some embodiments, method 600 determines (614) which facet characteristics from a predefined set of facet characteristics each candidate facet has, and ranks (614) the candidate facets further in accordance with the facet characteristics (i.e., the candidate facets are ranked in accordance with both their selectivity and their facet characteristics). Each of the facet characteristics has some predictive value or utility in terms of predicting which candidate facets are more likely to be selected by users to refine the search query for which the initial set of search results was produced. In some embodiments, some facet characteristics are positively correlated with predicted utility of candidate facets, while other facet characteristics are negatively correlated with the predicted utility of candidate facets. The selection of the set of facet characteristics is not part of method 600; that selection process is described more fully below.

In some embodiments, each of the facet characteristics has an associated weight, and the ranking of the candidate facets is based in part on the weights associated with the facet characteristics (616). As shown in FIG. 4, some embodiments assign weights to each of the predefined facet characteristics. In some embodiments the weights are all positive numbers, but in other embodiments some of the weights may be negative. As shown in FIG. 5, some embodiments assign a characteristic vector 510 to each candidate facet 506 in facet list 224. In some embodiments, the ranking of each candidate facet is calculated as the vector dot product of the characteristic vector and the weights of the facet characteristics. In embodiments where the characteristic vectors contain only zeros and ones, the ranking of each candidate facet is the sum of the weights of all of the facet characteristics that apply to the candidate facet. As noted above, in some embodiments the ranking of each candidate facet is based on a more complex ranking function that computes, for each candidate facet, scores for multiple clusters of facet characteristics and combines those scores to produce a ranking value, instead of assigning a single fixed weight to each facet characteristic.

In some embodiments, the weights of facet characteristics are manually assigned based on analysis or intrinsic knowledge of the facet characteristics. For example, one may assume that the facet characteristic of being the most selective should have a higher weight than being in the top five for selectivity.

In some embodiments, the weight associated with each facet characteristic is based on historical popularity of presentation facets having the facet characteristics (618). In these embodiments, data is collected on which presentation facets users actually select compared to the predicted calculated ranking, and machine learning is used to adjust the weights to bring them more in line with actual usage. The machine learning can be performed in a testing environment, or in a production environment on an occasional, periodic or continual basis to improve selection of the presentation facets.

The Facet Ranking Module 120, Control Module 112 or User Interface Module 114 selects (620) a plurality of presentation facets from among the candidate facets in accordance with the rankings of the candidate facets. In some embodiments, the selection (620) takes the top R candidate facets based on the ranking, where R is the number of facets that can be displayed to a user. In other embodiments, the number of presentation facets is not fixed, but may be based on rankings or other criteria. For example, if there are 15 highly ranked candidate facets, then some embodiments would select all of them as presentation facets, even if the screen could only display ten of them at a time. In other embodiments, the candidate facets may be partitioned into distinct subsets (such as by operator), and the highest ranked candidate facets within each partition are selected as presentation facets.

In some embodiments, the presentation facets are organized into clusters based on other properties. For example, in some embodiments once a list of presentation facets is selected, they are organized for presentation (e.g., ordered) by type (person facets, content facets, etc.). In some other embodiments, the display order of the presentation facets is based on other use metric(s). For example, although the selection of presentation facets may be based on a learned ranking, some embodiments display the presentation facets in order of how often they were previously clicked. In other embodiments, the display of the presentation facets is in alphabetical order. Some embodiments use a mixture of the above presentation methods, while other embodiments organize presentation facets based on history or preferences of a user (e.g., preferences recorded in a user profile). In some embodiments, additional facets are displayed when a user selects a "show me more" button or a "show me more like this" button (which reveals more facets of the same type or are similar to an identified presentation facet). In embodiments that provide the ability to reveal additional facets, the additional facets are selected from the candidate facets based on the ranking of the candidate facets or other properties of the candidate facets (such as the operator).

After the presentation facets are selected, the Facet Display Interface 218 within the User Interface Module 114 formats (622) the presentation facets for display. The display of the presentation facets is described in more detail below with respect to FIG. 7.

A user may select any of the presentation facets once they are displayed. In response to user selection of any one of the presentation facets (624), the Control Module 112 performs two operations: First, the Control Module 112 creates (626) a revised search query comprising the initial search query and the selected presentation facet. In some embodiments the revised search query is the concatenation of the text string of the initial query and a text string corresponding to the selected presentation facet. Second, the requery procedure 220 within the Query Module 116 generates (628) a revised set of search results based on the revised search query. In some embodiments, the revised search query generates the revised set of search results from scratch. In other words, the revised set of search results is retrieved from the database using the revised search query, without making use of the prior search results. In other embodiments, the revised search query is applied to the initial set of search results to generate the revised set of search results. Thus, in these other embodiments the revised set of search results is selected from the initial set of search results. After the revised set of search results is generated, Facet Generation Module 118 generates (608) a new set of candidate facets, and proceeds in the same way as processing the initial search query.

It is noted that in some embodiments the presentation facets are links back to the search augmentation system 100. Each such link contains a URL and one or more URL parameters that specifies the previous search query (or other information that enables the search augmentation system 100 to obtain the previous search query) and the user selected presentation facet. Thus, user selection of a presentation facet causes an HTTP request to be sent to the search augmentation system 100 with the aforementioned parameters.

In other embodiments, user selection of a presentation facet causes the client application (e.g., a browser application) to augment the search query with the presentation facet, but does not automatically send the resulting revised search query to the search augmentation system. This enables the user to further edit or further augment the search query before sending the search query to the search augmentation system 100 to obtain an new set of search results. In these embodiments, the client application 104 at the client includes instructions for responding to user selection of a facet by augmenting the search query with the presentation facet.

After the presentation facets are displayed, a user need not select one of them. The user can take any other action that is appropriate after querying the database. For example, the user could view any of the search results or could refine the search query manually.

Figure 7:
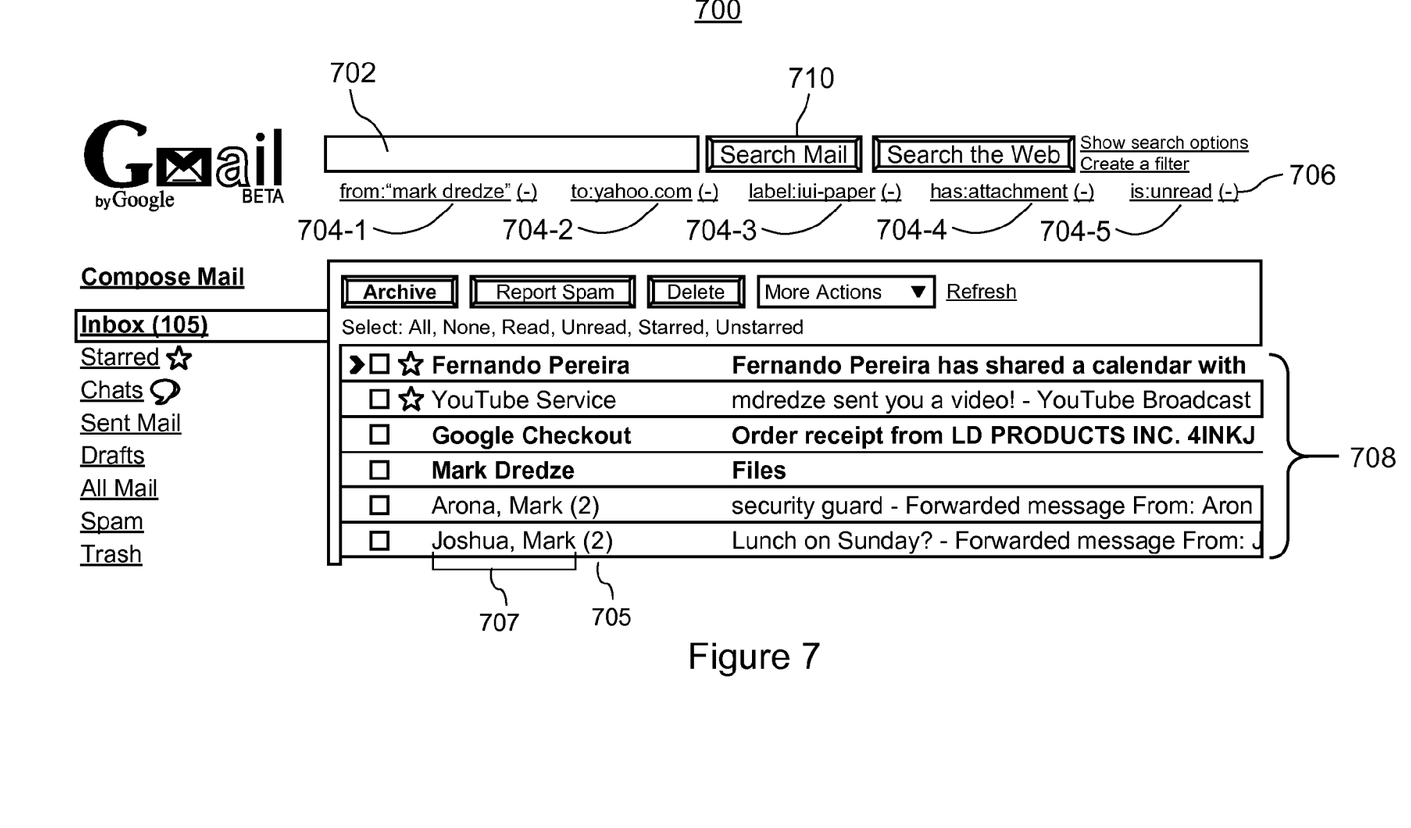
FIG. 7 provides an exemplary graphical user interface for an email system that generates and ranks facets for user selection according to some embodiments.

FIG. 7 shows an exemplary graphical user interface (GUI) 700 for an email system that generates facets for selection by a user. Search query entry box 702 allows a user to enter a search query. After the user enters a search query, the search query is displayed in the box 702, and the user may execute the query by pressing search button 710, pressing the ENTER key, or taking any other action designated by GUI 700 to execute the query. After execution of the search query, search results 708 are displayed in the GUI. In some embodiments, the "search results" 708 are the content of an email folder when no search query has been issued. For example, in GUI 700, the "search results" 708 show a list of conversations (some of which have more than one message, as indicated by the integer value 705 in parentheses adjacent the sender list 707 for each listed conversation that contains more than one message) in the user's inbox.

GUI 700 shows presentation facets 704-1, 704-2, . . . , 704-5, which are located in a horizontal array just below the search query entry box 702. In some embodiments, a user selects a presentation facet by clicking on it. For example, if a user clicks on presentation facet "to:yahoo.com" 704-2, the facet "to:yahoo.com" would be added to the search query. In alternative embodiments, the presentation facets are placed in other locations in the GUI 700, the presentation facets are aligned vertically, or there are more or fewer presentation facets displayed. In some embodiments, a clickable icon 706 is placed next to each presentation facet that designates the logically opposite facet. For example, The icon (−) 706 next to presentation facet "is:unread" 704-5 would designate the facet "not is:unread"; i.e., messages that have been read. In general, the clickable icon (−) 706 may be placed next to each of the presentation facets. One of skill in the art would recognize that many alternative graphic symbols or text could be used to designate presentation facets that are the exact opposites of the ones displayed.

Prior to execution of method 600 in FIGS. 6A and 6B, a set of facet characteristics is established. The universe of potential facet characteristics has at least three general categories. The first general category consists of facet characteristics based on the historical activities of one or more users. Here the idea is that past behavior is a predictor of future behavior. The second general category consists of measuring the effects of candidate facets on the initial set of search results, typically by counting based on some rule. The third category consists of intrinsic characteristics of the operators and their values.

The first category of facet characteristics is based on the search history of the user, or alternately the search history of a community of users. Previous user behavior is a good indication of a facet's usefulness. A candidate facet that has been frequently selected in the past by a user, or community of users, is likely to be selected in the future. Additionally, the context in which a facet was selected may influence its selection. For example, a user may search for the term "john" and then select the facet "from:john smith." In this case, the facet is useful in the context of the query "john" but may not be relevant to other queries.

There are several ways to evaluate candidate facets using the search history of users:

By facet: Score a candidate facet by how many times it has been used in previous queries. This includes every occurrence of the candidate facet in the user's query history, or the query history of a community of users.

By terms in search query: Given the terms in the current search query (if any), how many times has the candidate facet occurred together with all of these terms in previous queries? This includes any previous queries that contained all these terms plus the candidate facet as a subset, regardless of order in the previous queries. For example, the candidate facet "from:bill" and the query "to:me" would match the previous query "from:bill to:me has:attachment."

By exact query: Given the terms in the current search query and the candidate facet, how many times have all of these terms been used together in a previous query without any additional terms? For example, the candidate facet "from:bill" and the query "to:me" would not match the previous query "from:bill to:me has:attachment" because the previous query has the additional term "has:attachment."

These three popularity evaluation approaches provide a range of flexibility for measuring facet popularity. The first is context insensitive, the second mildly context sensitive and the third requires context. Different embodiments may use any subset of these approaches, or may use all three approaches.

Some embodiments of the present invention have facet characteristics corresponding to each popularity evaluation approach and how many times each candidate facet matches previous queries based on the popularity evaluation approach. For example, facet characteristics may correspond to zero matches, one or more match, exactly one match, exactly two matches, three or more matches, or other similar counts. Because of the three distinct approaches and the different counts that may be used, there can be many facet characteristics that measure popularity. Embodiments of the present invention may use any subset of these possible facet characteristics. One of skill in the art would recognize that alternative popularity approaches are possible and alternative matching methodologies are possible, creating a much broader list of possible facet characteristics.

Even when a candidate facet is not truly "popular," it may be popular relative to other candidate facets, or vice versa. Using the same three popularity approaches above, some embodiments of the present invention include facet characteristics based on the relative popularity of candidate facets. Some embodiments include facet characteristics that identify the most popular of the candidate facets, the second most popular of the candidate facets, the third most popular of the candidate facets, or the top five most popular of the candidate facets. For example, one exemplary facet characteristic is "the most popular candidate facet based on terms in the search query." This example facet characteristic would apply to only one candidate facet, unless there were two or more candidate facets that tied for usage.

The second category of facet characteristics is based on counting search results that match certain criteria. One criterion (sometimes called selectivity) is how evenly a facet splits the search results. This criterion can be converted into facet characteristics by comparing the relative selectivity of the candidate facets. For example, some embodiments include facet characteristics corresponding to: the candidate facet that is number 1 in selectivity, the candidate facet that is number 2 in selectivity, the candidate facet that is number 3 in selectivity, the candidate facets that are in the top five for selectivity, and the candidate facets that are not in the top 5 for selectivity. Note that the last two exemplary facet characteristics are opposites. Generally, not being in the top 5 for selectivity would be negatively correlated with the ultimate ranking of candidate facets.

Additional exemplary facet characteristics in the second category are based on simple counts of the candidate facets. In some embodiments, there is a facet characteristic based on the number of search results that match each candidate facet. For example, in an email context, the candidate facet "to:bob" would count the number of messages in the search results where Bob was listed in the "To:" field of the message header. More recent results may be more relevant to the user's search, so some embodiments include characteristics that count the number of matches within the most recent N records (e.g., email messages). For example, some embodiments include characteristics that count the number of matches from the first N search results, for N=5, 10, 20, or 50.

The third category of facet characteristics is based on the basic types of the candidate facets. The operators (e.g., "to:", "from:") and the values of the operands ("bill", "domain.com," etc.) may inherently affect the utility of a candidate facet. For example, facets that use the operator "to:" may be generally more relevant than facets that use the operator "cc:". The facet characteristics in this third category capture properties of candidate facets that are generally consistent across a wide range of users. The examples provided here pertain to the context of searching email, but similar analysis would create facet characteristics applicable to other contexts. Also, although a "person operator" such as "to:", "from:", or "cc:" would generally have an operand that is the name of a person or an email address, these operators can also have operands that are domain names (e.g., "to:google.com") or symbolically represent something else (e.g., "to:me"). These are described more fully above with respect to FIG. 3.

Some embodiments of the present invention include facet characteristics to identify: a person operator whose operand is the name of a person; a person operator whose operand is a domain name; a person operator whose operand is the user ("me"); a person operator whose operand is an email address; or a person operator whose operand contains a hyphen. In some embodiments, hyphens and other non-alphanumeric characters in an operand correspond to properties of an email address. For example, in some organizations, hyphens are used only within mailing lists, such as "all-domestic-employees@company.com". By examining the email addresses of other organizations, other facet characteristics could be created to evaluate candidate facets. Some embodiments include facet characteristics that are conjunctions of the type of the operator together with the type of the value as just described. For example, some embodiments include the facet characteristic of being sent "to a domain name" (this facet characteristic would apply to the candidate facet "to: google.com" but would not apply to the candidate facet "from:google.com" or the candidate facet "to:bob").

Some embodiments include the facet characteristic of having an operator value that is a personal name in a user's address book or having an operator value that is an email address in the user's address book. Address book membership may indicate familiarity and therefore may influence the relevance of any candidate facet that includes these people. Some embodiments also include a facet characteristic of having a personal name that is similar to a name that appears in the initial query. For example, if a user's initial query was "Bill," then the candidate "from:bill smith" may be particularly relevant.

Those of skill in the art would recognize that many combinations of facet characteristics are possible that are consistent with the teaching of the present invention. Furthermore, if additional metadata fields are available, additional candidate facets may be generated, and thus additional facet characteristics may be appropriate to evaluate the utility of the additional candidate facets.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A computer-implemented method of searching a set of information, comprising:
   at a computer system having one or more processors and memory storing one or more programs executed by the one or more processors, wherein performance of the method is controlled by execution of the one or more programs:
   generating an initial set of search results, comprising N search results, based on an initial search query;
   without further user input:
      generating a set of candidate facets, each of which can be used to select a subset of the initial set of search results;
      ranking the candidate facets in accordance with selectivity of the candidate facets with respect to at least some of the search results, wherein the selectivity of the candidate facets is based, at least in part, on how evenly each candidate facet, when combined with the initial search query, splits the initial set of search results, and a first respective candidate facet has higher selectivity than second and third respective candidate facets when the first, second and third facets, when combined with the initial search query, return N1, N2 and N3 search results, respectively, where N2 is greater than N1, N3 is less than N1, and the first facet, when combined with the initial search query, more evenly splits the search results than the second and third facets, when combined with the initial search query;
      selecting a plurality of presentation facets from among the candidate facets in accordance with the rankings of the candidate facets;
      formatting for display the presentation facets; and
   in response to user selection of any one of the presentation facets, generating a revised search query comprising the initial search query and the selected presentation facet, and generating a revised set of search results based on the revised search query.

2. The method of claim 1, including responding to the initial search query by formatting for concurrent display the initial search query, a subset of the initial set of search results, and the presentation facets.

3. The method of claim 1, wherein the generating of the initial set of search results includes limiting the initial set to a predefined positive integer number of search results.

4. The method of claim 1, further comprising, without further user input, determining for each candidate facet which facet characteristics from a predefined set of facet characteristics are characteristics of the candidate facet, wherein the ranking further includes ranking the candidate facets in accordance with the facet characteristics of the candidate facets.

5. The method of claim 4, wherein each facet characteristic of the predefined set of facet characteristics has an associated weight, and the ranking of the candidate facets is based in part on the weights associated with the facet characteristics of the candidate facets.

6. The method of claim 5, wherein the weight associated with each facet characteristic is based on historical popularity of presentation facets having the facet characteristic.

7. The method of claim 1, wherein the set of information comprises electronic messages associated with an individual user.

8. The method of claim 1, wherein the set of information comprises one or more of the set consisting of product specifications and information about product features for a set of products.

9. The method of claim 1, further including generating, in response to the user selection of one of the presentation facets, a revised set of candidate facets corresponding to the revised set of search results; and formatting for display at least a subset of the revised set of candidate facets.

10. The method of claim 1, wherein generating a set of candidate facets includes generating at least one candidate facet for each of a plurality of predefined operators based on the initial search results.

11. The method of claim 10, wherein generating a candidate facet for a respective predefined operator includes generating a candidate facet based on metadata in the initial search results.

12. A system for searching a set of information, comprising:
   one or more processors;
   memory; and
   one or more programs stored in the memory, the one or more programs comprising instructions executed by the one or more processors so as to:

generate an initial set of search results, comprising N search results, based on an initial search query;

without further user input:
- generate a set of candidate facets, each of which can be used to select a subset of the initial set of search results;
- rank the candidate facets in accordance with selectivity of the candidate facets with respect to at least some of the search results, wherein the selectivity of the candidate facets is based, at least in part, on how evenly each candidate facet, when combined with the initial search query, splits the initial set of search results, and a first respective candidate facet has higher selectivity than second and third respective candidate facets when the first, second and third facets, when combined with the initial search query, return N1, N2 and N3 search results, respectively, where N2 is greater than N1, N3 is less than N1, and the first facet, when combined with the initial search query, more evenly splits the search results than the second and third facets, when combined with the initial search quell;
- select a plurality of presentation facets from among the candidate facets in accordance with the rankings of the candidate facets; and
- format for display the presentation facets; and in response to user selection of any one of the presentation facets, generate a revised search query comprising the initial search query and the selected presentation facet, and generate a revised set of search results based on the revised search query.

13. The system of claim 12, wherein the instructions to generate the initial set of search results includes instructions that limit the initial set to a predefined positive integer number of search results.

14. The system of claim 12, further comprising instructions to determine for each candidate facet, without further user input, which facet characteristics from a predefined set of facet characteristics are characteristics of the candidate facet, wherein the instructions to rank the candidate facets further include instructions to rank the candidate facets in accordance with the facet characteristics of the candidate facets.

15. The system of claim 14, wherein each facet characteristic of the predefined set of facet characteristics has an associated weight, and the instructions to rank the candidate facets performs the ranking in part based on the weights associated with the facet characteristics of the candidate facets.

16. The system of claim 15, wherein the weight associated with each facet characteristic is based on historical popularity of presentation facets having the facet characteristic.

17. The system of claim 12, wherein the set of information comprises electronic messages associated with an individual user.

18. The system of claim 12, wherein the set of information comprises one or more of the set consisting of product specifications and information about product features for a set of products.

19. The system of claim 12, wherein the instructions to generate a set of candidate facets include instructions to generate, in response to the user selection of one of the presentation facets, a revised set of candidate facets corresponding to the revised set of search results; and the one or more programs include instructions for formatting for display at least a subset of the revised set of candidate facets.

20. The system of claim 12, wherein the instructions to generate the initial set of search results includes instructions to generate at least one candidate facet for each of a plurality of predefined operators based on the initial search results.

21. A non-transitory computer readable storage medium storing one or more programs configured for execution by one or more processors of a computer, the one or more programs comprising instructions to be executed by the one or more processors so as to:
- generate an initial set of search results, comprising N search results, based on an initial search query;
- without further user input:
  - generate a set of candidate facets, each of which can be used to select a subset of the initial set of search results;
  - rank the candidate facets in accordance with selectivity of the candidate facets with respect to at least some of the search results, wherein the selectivity of the candidate facets is based, at least in part, on how evenly each candidate facet, when combined with the initial search query, splits the initial set of search results, and a first respective candidate facet has higher selectivity than second and third respective candidate facets when the first, second and third facets, when combined with the initial search query, return N1, N2 and N3 search results, respectively, where N2 is greater than N1, N3 is less than N1, and the first facet, when combined with the initial search query, more evenly splits the search results than the second and third facets, when combined with the initial search query;
  - select a plurality of presentation facets from among the candidate facets in accordance with the rankings of the candidate facets; and
  - format for display the presentation facets; and
- in response to user selection of any one of the presentation facets, generate a revised search query comprising the initial search query and the selected presentation facet, and generate a revised set of search results based on the revised search query.

22. The computer readable storage medium of claim 21, wherein the instructions to generate the initial set of search results includes instructions that limit the initial set to a predefined positive integer number of search results.

23. The computer readable storage medium of claim 21, further comprising instructions to determine for each candidate facet, without further user input, which facet characteristics from a predefined set of facet characteristics are characteristics of the candidate facet, wherein the instructions to rank the candidate facets further include instructions to rank the candidate facets in accordance with the facet characteristics of the candidate facets.

24. The computer readable storage medium of claim 23, wherein each facet characteristic of the predefined set of facet characteristics has an associated weight, and the instructions to rank the candidate facets performs the ranking in part based on the weights associated with the facet characteristics of the candidate facets.

25. The computer readable storage medium of claim 24, wherein the weight associated with each facet characteristic is based on historical popularity of presentation facets having the facet characteristic.

26. The computer readable storage medium of claim 21, wherein the set of information comprises electronic messages associated with an individual user.

27. The computer readable storage medium of claim 21, wherein the set of information comprises one or more of the set consisting of product specifications and information about product features for a set of products.

28. The computer readable storage medium of claim 21, wherein the instructions to generate a set of candidate facets include instructions to generate, in response to the user selection of one of the presentation facets, a revised set of candidate facets corresponding to the revised set of search results; and the one or more programs include instructions for formatting for display at least a subset of the revised set of candidate facets.

29. The computer readable storage medium of claim 21, the instructions to generate a set of candidate facets include instructions to generate at least one candidate facet for each of a plurality of predefined operators based on the initial search results.

* * * * *

UNITED STATES PATENT AND TRADEMARK OFFICE
CERTIFICATE OF CORRECTION

| | |
|---|---|
| PATENT NO. | : 8,433,705 B1 |
| APPLICATION NO. | : 12/894079 |
| DATED | : April 30, 2013 |
| INVENTOR(S) | : Mark H. Dredze et al. |

It is certified that error appears in the above-identified patent and that said Letters Patent is hereby corrected as shown below:

In the Claims:

In column 19, line 21, please delete "quell" and add --query--.

Signed and Sealed this
Twenty-sixth Day of November, 2013

Margaret A. Focarino
*Commissioner for Patents of the United States Patent and Trademark Office*